(12) United States Patent
Watanabe et al.

(10) Patent No.: US 7,590,468 B2
(45) Date of Patent: Sep. 15, 2009

(54) ROBOT SYSTEM

(75) Inventors: Atsushi Watanabe, Tokyo (JP);
Kazunori Ban, Minamitsuru-gun (JP);
Ichiro Kanno, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 1263 days.

(21) Appl. No.: 10/952,101

(22) Filed: Sep. 29, 2004

(65) Prior Publication Data
US 2005/0071048 A1 Mar. 31, 2005

(30) Foreign Application Priority Data
Sep. 29, 2003 (JP) ............................. 2003-337892

(51) Int. Cl.
*G05B 19/00* (2006.01)
(52) U.S. Cl. ....................... 700/259; 700/245; 700/256; 700/247; 700/249; 700/253; 345/1.2; 345/158; 345/161; 345/169; 345/2.1; 368/680; 368/683; 219/121.63; 219/121.64; 318/568.1; 318/568.11; 318/568.12; 318/568.13; 318/568.19; 901/1; 901/3; 901/6; 901/15; 901/49
(58) Field of Classification Search ................. 700/245, 700/256, 247, 253, 249, 259; 219/121.63, 219/121.64; 318/568.1, 568.11, 568.12, 318/568.13, 568.19, 568.21, 568.22, 567, 318/563, 625, 568.2; 901/2, 8, 9, 16, 23, 901/245, 256, 247, 253, 249, 259
See application file for complete search history.

(56) References Cited

U.S. PATENT DOCUMENTS

| | | | | |
|---|---|---|---|---|
| 4,517,652 A | * | 5/1985 | Bennett et al. | 700/264 |
| 4,761,745 A | * | 8/1988 | Kodaira | 700/254 |
| 5,495,410 A | * | 2/1996 | Graf | 700/86 |
| 5,798,627 A | * | 8/1998 | Gilliland et al. | 318/568.14 |
| 5,880,956 A | * | 3/1999 | Graf | 700/86 |
| 6,243,625 B1 | * | 6/2001 | Wyatt et al. | 700/284 |
| 6,330,495 B1 | * | 12/2001 | Kaneko et al. | 700/264 |
| 6,332,102 B1 | * | 12/2001 | Nakajima et al. | 700/245 |

(Continued)

FOREIGN PATENT DOCUMENTS

JP 5-2205 1/1993

(Continued)

*Primary Examiner*—Khoi Tran
*Assistant Examiner*—McDieunel Marc
(74) *Attorney, Agent, or Firm*—Drinker Biddle & Reath LLP

(57) ABSTRACT

A robot system can grasp and take out one of a plurality of workpieces placed in a basket-like container by a hand mounted at the forward end of a robot arm. The workpiece is detected by a visual sensor, and the robot is controlled depending on a position and an orientation of the workpiece. When a problem such as interference or the like occurs, information relating to the problem is stored in a robot control unit or a visual sensor control unit. Information relating to the problem includes a predetermined amount of the latest data retrospectively traced from the time point of problem occurrence, a position which the robot has reached, the target position data, the content of the process executed by the visual sensor, and the detection result. When the problem is reproduced, these data are used to simulate the situation at the time of problem occurrence by using simulation unit. The situation at the time of problem occurrence can also be reproduced by using the actual robot without using the simulation unit.

18 Claims, 12 Drawing Sheets

U.S. PATENT DOCUMENTS

| | | | |
|---|---|---|---|
| 6,356,806 B1 * | 3/2002 | Grob et al. | 700/245 |
| 6,381,580 B1 * | 4/2002 | Levinson | 705/8 |
| 6,415,204 B1 * | 7/2002 | Hirabayashi et al. | 700/245 |
| 6,509,576 B2 * | 1/2003 | Woo-Dong | 250/559.33 |
| 6,522,949 B1 * | 2/2003 | Ikeda et al. | 700/245 |
| 6,597,971 B2 * | 7/2003 | Kanno | 700/245 |
| 6,836,700 B2 * | 12/2004 | Greene et al. | 700/245 |
| 6,853,881 B2 * | 2/2005 | Watanabe et al. | 700/264 |

FOREIGN PATENT DOCUMENTS

| | | |
|---|---|---|
| JP | 2662990 | 6/1997 |
| JP | 9-311715 | 12/1997 |
| JP | 10-309683 | 11/1998 |
| JP | 11-167404 | 6/1999 |
| JP | 2000-263481 | 9/2000 |
| JP | 2001-179668 | 7/2001 |
| JP | 2001-277163 | 10/2001 |

* cited by examiner

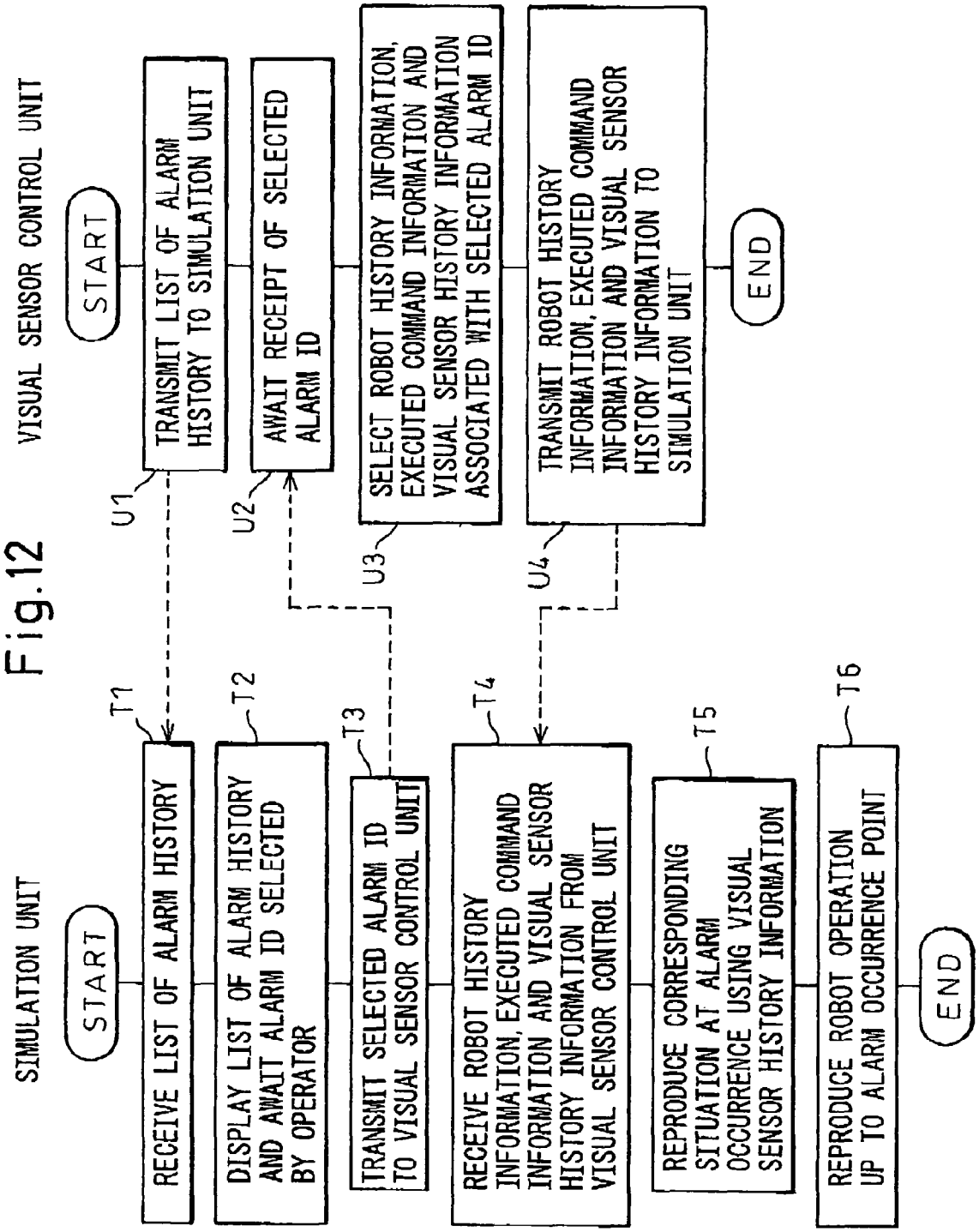

ROBOT SYSTEM

BACKGROUND OF THE INVENTION

1. Field of the Invention

The present invention relates to a robot system employed for various applications which use an industrial robot and, more particularly, to a technique for reproducing a situation in which an alarm is issued in the case where the robot or an object mounted or held thereon clashes with something.

2. Description of the Related Art

If trouble occurs at a robot which performs an operation designated by an instruction such as a command in a taught operation program or the like, it generally means that the external environment or the internal conditions which have been assumed for the operation of the robot have been changed. A robot system should be built such that such a situation can rarely occur. However, in the event that such a situation occurs, the system is unavoidably stopped quickly to secure safety.

On the other hand, in an application, for example, for taking each workpiece out of bulk workpieces, the robot is required to perform the operation according to the circumstances so that the robot changes its motion each time depending on irregular positions of the workpieces. In other words, the external environment is so unstable in such an application that it is not uncommon to issue an alarm relating to the contact or clash with comparative frequency. Therefore, if the system is stopped each time the alarm is issued, the working efficiency would be greatly deteriorated.

Techniques to avoid this inconvenience are disclosed, for example, in Japanese Patent No. 2662990 and Japanese Unexamined Patent Publication No. 2000-263481. The techniques described in these two patent documents concern a method of automatically restoring the system upon occurrence of a trouble, and these techniques make it possible to reduce the frequency at which the system is stopped and to improve the operating efficiency. However, there is raised a problem that a desire to know a situation in which the alarm is issued cannot be easily satisfied.

On the other hand, the techniques for knowing the temporally past phenomenon and the conditions at a spatially remote place are described, for example, in Japanese Unexamined Patent Publications No. 10-309683, No. 2001-179668 and No. 2001-277163.

The Japanese Unexamined Patent Publication No. 10-309683, which relates to a robot and a method of analyzing an error caused by the robot, discloses the technique to record-data relating to a control for a motor, such as the operating waveform or the like data of the motor, for the purpose of subsequent analysis.

Japanese Unexamined Patent Publication No. 2001-179668, which relates to a robot system for coping with accident, discloses a technique for monitoring a circumstance of an accident at an remote place using a monitoring device, such as a camera or the like, and a robot manipulator. Specifically, the point of this technique is to prepare a monitoring device operable at a remote place to grasp the circumstance of the remote place.

Further, Japanese Unexamined Patent Publication No. 2001-277163 relates to a robot controller and a robot control method. A feature of the technique described in this document is that a system behavior plan and the result of operation based on the plan are stored in a log. Specifically, in this technique, information on the operation is logged to permit subsequent analysis of an operational status of a mobile robot.

In the event of some failure in the robot system, it is desirable to take a preventive measure to avoid such a failure in the future. This requires analysis of the phenomenon. However, such an analysis is difficult in the case where the system has the ability to automatically restore itself without stopping the operation. The ability to automatically restore itself, therefore, is not always contributive to a reduction in the frequency of the trouble. In other words, the technique described in Japanese Patent No. 2662990 or Japanese Unexamined Patent Publication No. 2000-263481 is simply to automatically restore the system and provides no means for subsequent analysis of the cause of the trouble. Therefore, even though the system may be restored automatically, the system is finally required to be stopped in order to investigate the cause of the alarm, while no data useful to investigate the cause of the alarm can be obtained.

Also, in the techniques described in Japanese Unexamined Patent Publications No. 10-309683 and No. 2001-277163, only specific data are collected and it is difficult to reproduce the trouble that has actually occurred. Further, the technique described in Japanese Unexamined Patent Publication No. 2001-179668 has no ability other than to confirm the phenomenon such as an accident at a remote place, or the like, in real time.

SUMMARY OF THE INVENTION

Accordingly, an object of the present invention is to provide a robot system with a function to obtain information usable for reproducing a trouble which may occur (at the time of an alarm which may be issued) and a function of "reproducing the situation at the time of alarm" with an actual machine or on a simulator, thereby making it possible to reproduce the phenomenon with the actual machine when the system is not busy or to virtually reproduce it at a remote place.

The present invention is intended to utilize these functions to eliminate the need to stop the system in operation, particularly for analysis of the cause, thereby contributing to an improved operating efficiency and system reliability.

The present invention can solve the above-mentioned problems by providing a robot system with a function to record information on the situation at the time of an alarm and to reproduce the situation at the time of an alarm using the recorded information. The present invention can be implemented in several specific configurations.

A robot system according to a first aspect of the present invention includes a robot, and a visual sensor connected to the robot through a data transmitting means and for measuring one or both of a position and an orientation of an object in accordance with a command from the robot and transmitting a measurement result to the robot. The robot also includes a means for sending, upon occurrence of a predefined alarm in the robot in operation, a notification of the alarm occurrence, and an operating condition of the robot at the time of alarm occurrence as robot history information, to the visual sensor, a means for receiving the robot history information from the visual sensor, and a means for reproducing the operating condition of the robot at the time of alarm occurrence using the received robot history information. The visual sensor includes an accumulation means for accumulating measurement processing information obtained by measurement, a recording means for recording, upon receipt of the notification of the alarm occurrence and the robot history information from the robot, the robot history information, while at the same time selecting measurement processing information associated with the robot operation at the time of alarm occurrence from the measurement processing information accumulated in the accumulation means and recording the selected measurement processing information as sensor history information, a means for sending the robot history information recorded in the recording means to the robot, and a means for reproducing a processing process of the visual sensor using the sensor history information.

A robot system according to a second aspect of the present invention includes a robot, and a visual sensor connected to the robot through a data transmitting means for measuring one or both of a position and an orientation of an object in accordance with a command from the robot and transmitting a measurement result to the robot. The robot also includes a means for temporarily storing a predetermined amount of the latest executed operation commands as executed command information, a means for sending, upon occurrence of a predefined alarm in the robot in operation, a notification of an alarm occurrence, the executed command information, and an operating condition of the robot at the time of alarm occurrence as robot history information, to the visual sensor, a means for receiving the executed command information and the robot history information from the visual sensor, and a means for reproducing the operating condition of the robot before and at the time of alarm occurrence using the received executed command information and robot history information. The visual sensor also includes an accumulation means for accumulating measurement processing information obtained by measurement, a recording means for recording, upon receipt of the notification of the alarm occurrence, the executed command information and the robot history information from the robot, the executed command information and the robot history information while, at the same time, selecting measurement processing information associated with the robot operation at the time of alarm occurrence from the measurement processing information accumulated in the accumulation means and recording the selected measurement processing information as sensor history information, a means for sending the executed command information and robot history information recorded in the recording means to the robot, and a means for reproducing a processing process of the visual sensor using the sensor history information.

A robot system according to a third aspect of the present invention includes a robot, and a simulation unit connected to the robot through a communication line and for simulating operations of the robot. The robot also includes a means for recording, upon occurrence of a predefined alarm in the robot in operation, an operating condition of the robot at the time of alarm occurrence as robot history information, and a means for transmitting the robot history information through the communication line to the simulation unit. The simulation unit also includes a means for receiving the robot history information transmitted from the robot, and a means for reproducing the operating condition of the robot at the time of alarm occurrence by simulation using the received robot history information.

A robot system according to a fourth aspect of the present invention includes a robot, and a simulation unit connected to the robot through a communication line and for simulating operations of the robot. The robot also includes a means for temporarily storing a predetermined amount of the latest executed operation commands as executed command information, a means for recording, upon occurrence of a predefined alarm in the robot in operation, an operating condition of the robot at the time of alarm occurrence as robot history information, and a means for transmitting the executed command information and the robot history information through the communication line to the simulation unit. The simulation unit also includes a means for receiving the executed command information and robot history information transmitted from the robot, and a means for reproducing the operating condition of the robot before and at the time of alarm occurrence by simulation using the received executed command information and robot history information.

In all of the first to fourth embodiments described above, the robot history information preferably includes information representing at least one of a position which the robot has reached, a target position at which the robot aimed, an interpolation mode used by the robot to operate, an alarm generated in the robot, and the time of the alarm occurrence.

A robot system according to a fifth aspect of the present invention includes a robot, a visual sensor connected to the robot through a data transmitting means and for measuring one or both of a position and an orientation of an object in accordance with a command from the robot and transmitting a measurement result to the robot, and a simulation unit connected to the robot through a communication line and for simulating one or both of operations of the robot and processes of the visual sensor. The robot also includes a means for notifying, upon occurrence of a predefined alarm in the robot in operation, an alarm occurrence to the visual sensor and recording an operating condition of the robot at the time of alarm occurrence as robot history information, a means for receiving measurement processing information of the visual sensor associated with the robot operation at the time of alarm occurrence from the visual sensor and recording the measurement processing information as sensor history information, and a means for transmitting the robot history information and the sensor history information through the communication line to the simulation unit. The visual sensor also includes an accumulation means for accumulating the measurement processing information obtained by measurement, and a means for selecting, upon receipt of the notification of the alarm occurrence from the robot, the measurement processing information associated with the robot operation at the time of alarm occurrence from the measurement processing information accumulated in the accumulation means, and transmitting the selected measurement processing information to the robot. The simulation unit also includes a means for receiving the robot history information and sensor history information transmitted from the robot, a means for reproducing the operating condition of the robot at the time of alarm occurrence by simulation using the received robot history information, and a means for reproducing the processing process of the visual sensor by simulation using the received sensor history information.

A robot system according to a sixth aspect of the present invention includes a robot, a visual sensor connected to the robot through a data transmitting means and for measuring one or both of a position and an orientation of an object in accordance with a command from the robot and transmitting a measurement result to the robot, and a simulation unit connected to the robot through a communication line and for simulating one or both of operations of the robot and processes of the visual sensor. The robot also includes a means for temporarily storing a predetermined amount of the latest executed operation commands as executed command information, a means for notifying, upon occurrence of a predefined alarm in the robot in operation, an alarm occurrence to the visual sensor and recording an operating condition of the robot at the time of alarm occurrence as robot history information, a means for receiving measurement processing information of the visual sensor associated with the robot operation at the time of alarm occurrence from the visual sensor and recording the measurement processing information as sensor history information, and a means for transmitting the executed command information, the robot history information and the sensor history information through the communication line to the simulation unit. The visual sensor also includes an accumulation means for accumulating the measurement processing information obtained by measurement, and a means for selecting, upon receipt of the notification of the alarm occurrence from the robot, the measurement processing information associated with the robot operation at the time of alarm occurrence from the measurement processing information accumulated in the accumulation means and transmitting the selected measurement processing information to the robot. The simulation unit also includes a means for receiving the executed command information, the robot history information and the sensor history information transmitted from the robot, a means for reproducing the operating condition of the robot before and at the time of alarm occurrence by simulation using the received executed command information and robot history information, and a means for reproducing the processing process of the visual sensor by simulation using the received sensor history information.

A robot system according to a seventh aspect of the present invention includes a robot, a visual sensor connected to the robot through a data transmitting means and for measuring one or both of a position and an orientation of an object in accordance with a command from the robot and transmitting a measurement result to the robot, and a simulation unit connected to the robot sensor through a communication line and for simulating one or both of operations of the robot and processes of the visual sensor. The robot also includes a means for sending, upon occurrence of a predefined alarm in the robot in operation, a notification of the alarm occurrence, and an operating condition of the robot at the time of alarm occurrence as robot history information, to the visual sensor. The visual sensor also includes an accumulation means for accumulating measurement processing information obtained by measurement, a means for recording, upon receipt of the notification of the alarm occurrence and the robot history information from the robot, the robot history information, while at the same time selecting measurement processing information associated with the robot operation at the time of alarm occurrence from the measurement processing information accumulated in the accumulation means and recording the selected measurement processing information as sensor history information, and a means for transmitting the robot history information and the sensor history information through the communication line to the simulation unit. The simulation unit also includes a means for receiving the robot history information and sensor history information transmitted from the visual sensor, a means for reproducing the operating condition of the robot at the time of alarm occurrence by simulation using the received robot history information, and a means for reproducing the processing process of the visual sensor by simulation using the received sensor history information.

A robot system according to an eighth aspect of the present invention includes a robot, a visual sensor connected to the robot through a data transmitting means and for measuring one or both of a position and an orientation of an object in accordance with a command from the robot and transmitting a measurement result to the robot, and a simulation unit connected to the visual sensor through a communication line and for simulating one or both of operations of the robot and processes of the visual sensor. The robot also includes a means for temporarily storing a predetermined amount of the latest executed operation commands as executed command information, and a means for sending, upon occurrence of a predefined alarm in the robot in operation, a notification of the alarm occurrence, the executed command information, and an operating condition of the robot at the time of alarm occurrence as robot history information, to the visual sensor. The visual sensor also includes an accumulation means for accumulating measurement processing information obtained by measurement, a means for recording, upon receipt of the notification of the alarm occurrence, the executed command information and the robot history information from the robot, the executed command information and the robot history information while, at the same time, selecting measurement processing information associated with the robot operation at the time of alarm occurrence from the measurement processing information accumulated in the accumulation means and recording the selected measurement processing information as sensor history information and, a means for transmitting the executed command information, the robot history information and the sensor history information through the communication line to the simulation unit. The simulation unit also includes a means for receiving the executed command information, the robot history information and the sensor history information transmitted from the visual sensor, a means for reproducing the operating condition of the robot before and at the time of alarm occurrence by simulation using the received executed command information and robot history information, and a means for reproducing the processing process of the visual sensor by simulation using the received sensor history information.

In the first aspect or the second aspect or any one of the fifth to eighth aspects described above, the robot history information preferably includes information representing at least one of a position which the robot has reached, a target position at which the robot aimed, an interpolation mode used by the robot to operate, an alarm generated in the robot, and the time of alarm occurrence. Also, the sensor history information preferably includes information representing at least one of an image taken by the visual sensor, a content processed by the visual sensor, and a result of measurement processing in the visual sensor.

Also, in any of the third to eighth aspects described above, the communication line is preferably switchable between a connected state and a disconnected state. Further, preferably, the simulation unit is adapted to be able to load a robot program describing the operation of the robot through the communication line, and has a function to change a teaching content of the robot program on the simulation unit and then apply the changed robot program to the robot.

Preferably, the simulation unit is adapted to be able to load visual sensor processing parameters defining a process of the visual sensor through the communication line, and has a function to change a content of the visual sensor processing parameters on the simulation unit and then apply the changed visual sensor processing parameters to the visual sensor.

BRIEF DESCRIPTION OF THE DRAWINGS

The above and other objects, features and advantages will be described in more detail below based on the preferred embodiments with reference to the accompanying drawings, wherein:

FIG. 12 is a flowchart illustrating an outline of a process executed for reproducing the alarm in the fourth embodiment.

DETAILED DESCRIPTION

Figure 1:
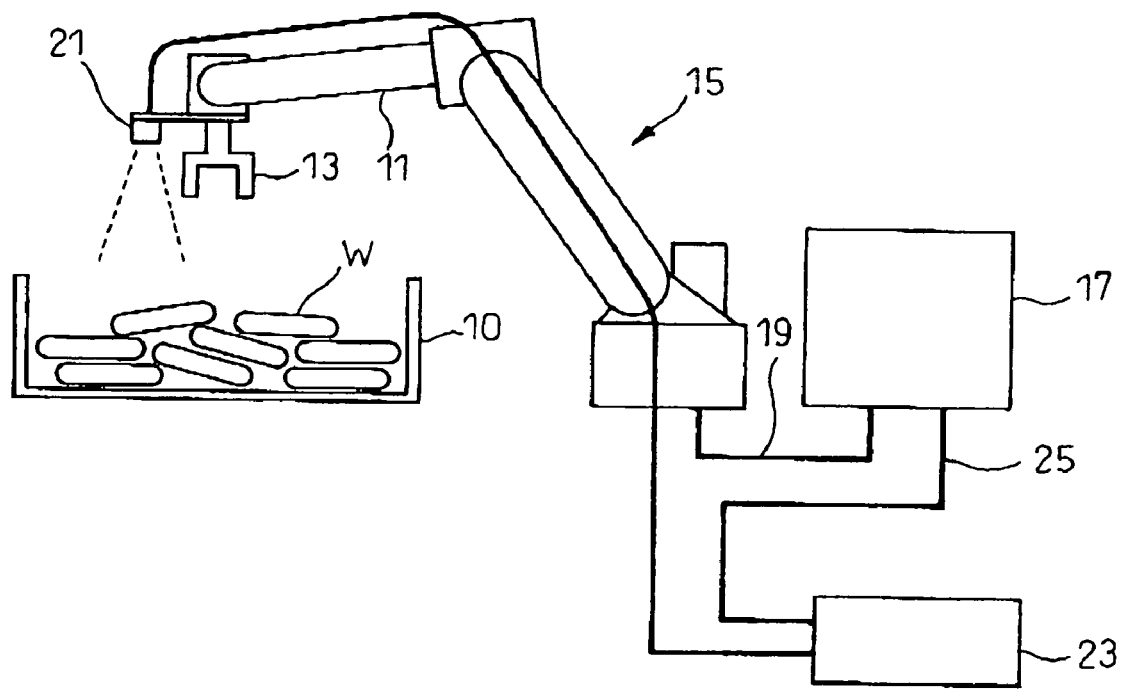
FIG. 1 is a diagram illustrating an outline of a robot system according to a first embodiment of the present invention.

FIGS. 1 to 4 show typical arrangements of robot systems according to first to fourth embodiments of the present invention, respectively. The arrangement according to the first embodiment shown in FIG. 1 corresponds to the first and second aspects described above; the arrangement according to the second embodiment shown in FIG. 2 corresponds to the third and fourth aspects described above; the arrangement according to the third embodiment shown in FIG. 3 corresponds to the fifth and sixth aspects described above; and the arrangement according to the fourth embodiment shown in FIG. 4 corresponds to the seventh and eighth aspects described above.

Firstly, technical means commonly used in all or some of the embodiments will be described below.

An exemplary application to which the robot system according to each embodiment is applied is an operation in which each of a plurality of workpieces W placed in bulk in a basket-like container 10 is grasped and taken out by a hand 13 mounted at the forward end of a robot arm 11. In any of the embodiments, in order to control a robot (body mechanism) 15 and the hand 13, a robot control unit 17 is arranged and connected to the robot 15 and the hand 13 by means of a cable 19. The application in which one workpiece W is taken out of the bulk workpieces W is only illustrative and not intended to exclude other applications (welding by real-time tracking using the visual sensor, for example) of the present invention.

In the first, third and fourth embodiments, in order to control the robot based on a position and an orientation of each workpiece W, a visual sensor (sensor head) 21 is mounted on the forward end of the robot arm 11 along with the hand 13. The visual sensor 21 is typically a three-dimensional visual sensor, such as a stereo type one having two video cameras or a combination of a video camera (photo detector) and a projector for projecting a patterned light such as a slit light or a spot light.

In the embodiment using the visual sensor 21, a visual sensor control unit 23 is provided for controlling an operation (including imaging, projection of patterned light, and detection of reflected light, etc.) of the sensor head 21 and processing signals (including video signals, and reflected light detection signals, etc.) obtained from the sensor head 21 to conduct a three-dimensional measurement. The robot control unit 17 and the visual sensor control unit 23 are connected to each other through a data transmitting means 25 in order to exchange data and commands between them.

In the second, third and fourth embodiments, a simulation unit 27 is provided for reproducing a situation in which an alarm has occurred, without using the robot (the actual machine) 15. The simulation unit 27 receives data required for simulation to reproduce the situation at the time of alarm occurrence and transmits related commands. For this purpose, the simulation unit 27 is connected to the robot control unit 17 (in the second and third embodiments) or the visual sensor control unit 23 (in the fourth embodiment) through a communication line 29.

The robot control unit 17 is a typically-used well-known type in which a main board is equipped with a CPU, a ROM, a RAM, a nonvolatile RAM, and others. The system software for controlling the robot 15 is stored in the ROM. This system software is typically copied into the RAM and then executed by the CPU. Also, a robot program (operation program) including operation commands prepared by the user is stored in the nonvolatile RAM. The robot program is also typically copied into the RAM and then executed by the CPU.

The main board of the robot control unit 17 is connected through a servo amplifier to a servo motor for driving the robot arm 11 on one hand and directly connected to an encoder of the servo motor and another signal lines for I/O signals (external input/output signals) on the other hand. Also, a teaching panel (not shown) with a display is connected through an input/output interface for the teaching panel to the main board of the robot control unit 17. A display may be disposed on the front of the robot control unit 17.

When an alarm occurs, information relating to the alarm is recorded in the RAM or the nonvolatile RAM. As is well known, various alarms are used for various kind of troubles. A typical trouble against which an alarm is issued includes interference (clash) between the robot arm 11 or a robot equipment such as the visual sensor 21 or the hand 13, etc. and other objects.

In this exemplary application, a trouble (alarm) considered most liable to occur is interference between the wall of the basket-like container 10 or the workpiece W to be held and another one of the surrounding workpieces. A method of detecting an interference is well known and therefore not described in detail below (for example, a method of detecting a clash by use of an external disturbance estimation parameter of a servo system can be used). Alarms against troubles other than the interference includes an abnormal operation of the robot 15 such as a large deviation from a taught path, a failure of the hand 13, and a detection failure of the visual sensor 21.

When these troubles occur, the following information is recorded in the nonvolatile RAM.

Alarm content: The type of the trouble is recorded as a predetermined code or character. For example, codes are defined as "001" for an interference, "010" for an abnormal operation of the robot, "011" for a failure of the visual sensor, and "100" for a failure of the hand.

Time of alarm occurrence

Position and orientation of the robot at time of alarm occurrence

Destination (including a position and orientation upon arrival at a target place) at which the robot aimed immediately before alarm occurrence Coordinate system used immediately before alarm occurrence: For example, a code name of a user coordinate system or a tool coordinate system, or a position and orientation data for an origin of the coordinate system are recorded. These data include a matrix representing a relation between a user coordinate system and a reference world coordinate system, and a matrix representing a relation between a tool coordinate system and a mechanical interface coordinate system.

Interpolation mode used in the robot operation executed immediately before alarm occurrence: axial interpolation, linear interpolation, etc. are recorded as a predetermined code or character. For example, the codes are defined as "001" for axial interpolation and "010" for linear interpolation.

A predetermined amount of the latest executed commands of a robot program: This is a data for allowing subsequent reproduction of a path along which the robot 15 has moved for a predetermined time period before the alarm occurrence. This data is stored in the RAM or the nonvolatile RAM. The predetermined amount is defined as, for example, "an information amount by bits", "the number of commands" or "the commands executed within a predetermined time period in the past" and is preset in the robot control unit 17.

The visual sensor control unit 23, as described above, controls an operation (including imaging, projection of patterned light, and detection of reflected light, etc.) of the sensor head 21, and processes signals (including video signals, and reflected light detection signals, etc.) obtained from the sensor head 21 to conduct a three-dimensional measurement. A configuration, the basic functions, etc. of the visual sensor control unit 23 are well known and therefore not described in detail herein. The main board is equipped with a CPU, a ROM, a RAM, a nonvolatile RAM, and a frame memory, etc., and a system software for controlling the visual sensor 21 is stored in the ROM.

This system software is typically copied into the RAM and then executed by the CPU. The main board is connected to the visual sensor (sensor head) 21 through a visual sensor I/F, so that information of the image provided by the visual sensor 21, for example, is loaded into a frame memory and processed by the CPU. The result of this processing is sent to the robot control unit 17 through the data transmitting means 25, and is used to control the operation of the robot 15.

Also, in the visual sensor control unit 23, the processes executed by the visual sensor 21 and the used images are accumulated in the RAM or the nonvolatile RAM (hard disk, etc.) as a log. When an alarm occurs in the robot control unit 17, the visual sensor control unit 23 receives a notification of the alarm occurrence through the data transmitting means 25 and collects sensor history information including information associated with the latest executed visual sensor processing and related information associated with the previously executed visual sensor processing. The collected sensor history information is recorded in the RAM or the nonvolatile RAM.

This sensor history information includes the following.

Content of the visual sensor processing: the content includes, for example, history data representing a series of processes from a detection of a workpiece W up to a measurement of a position and an orientation of the workpiece W to be grasped.

Parameters used for the visual sensor processing: the parameters include, for example, a electronic shutter speed of the imaging means, a threshold value used for detecting a workpiece W, an affine transformation parameter value for a model image used in a matching method.

Time point at which the visual sensor processing is executed

Image taken by the visual sensor 21

Result of the visual sensor processing: the result includes, for example, a position and an orientation of the workpiece W to be held.

The visual sensor control unit 23 has attached thereto a monitor display (not shown), on which the various accumulated information described above, as well as the image being processed or immediately after being processed, can be displayed. Also, with regard to the process described later, an item can be selected by the operator on the screen using a pointer such as a mouse.

The simulation unit 27 used in the second to fourth embodiments contains geometric data relating to the robot 15 and the peripheral devices thereof and can simulate the operation of the robot 15. Although a personal computer is a typical example, other conventional simulation units may be used as the simulation unit 27. In the third and fourth embodiments, the simulation unit 27 can execute the same process as the visual sensor control unit 23, and reproduce a specific imaging processing by receiving the image and the parameters necessary for image processing through a communication line from the visual sensor control unit 23.

The simulation unit 27 has attached thereto a monitor display (not shown), on which the contents of simulation and the various accumulated information described above can be displayed. Also, with regard to the process described later, an item can be selected by the operator on the screen using a pointer such as a mouse.

Based on the foregoing premise, an outline of a process in each of the first to fourth embodiments will be described with reference to the flowcharts shown in FIGS. 5 to 12. The example of the content of the information exchanged between the devices in the first to fourth embodiments are described above, and will not be described again below. Therefore, only the key points of each step will be described.

First Embodiment (FIG. 1)

Figure 5:
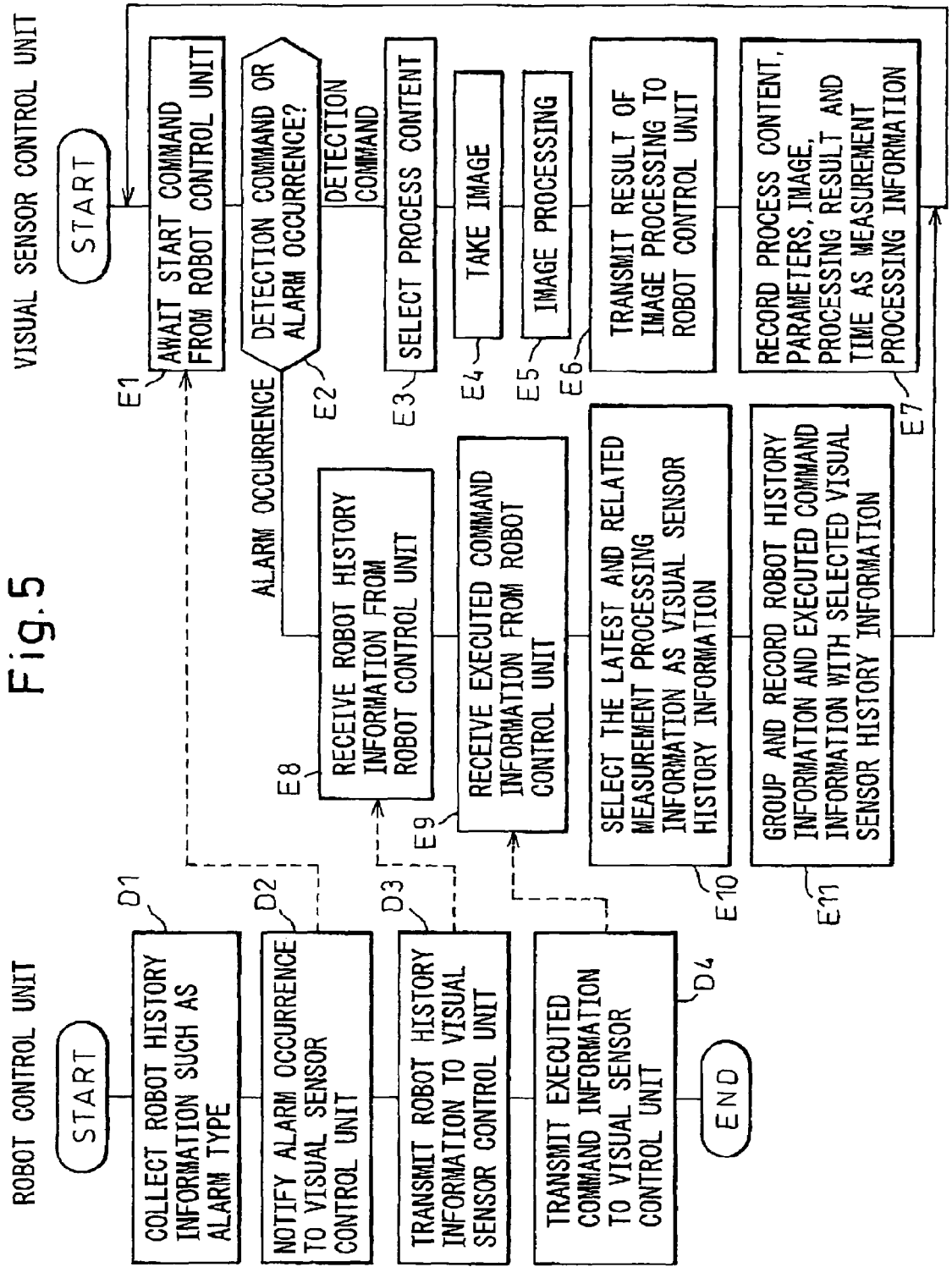
FIG. 5 is a flowchart illustrating outlines of a process executed at the time of alarm occurrence and a process executed in preparation for the alarm occurrence in the first embodiment.
Figure 6:
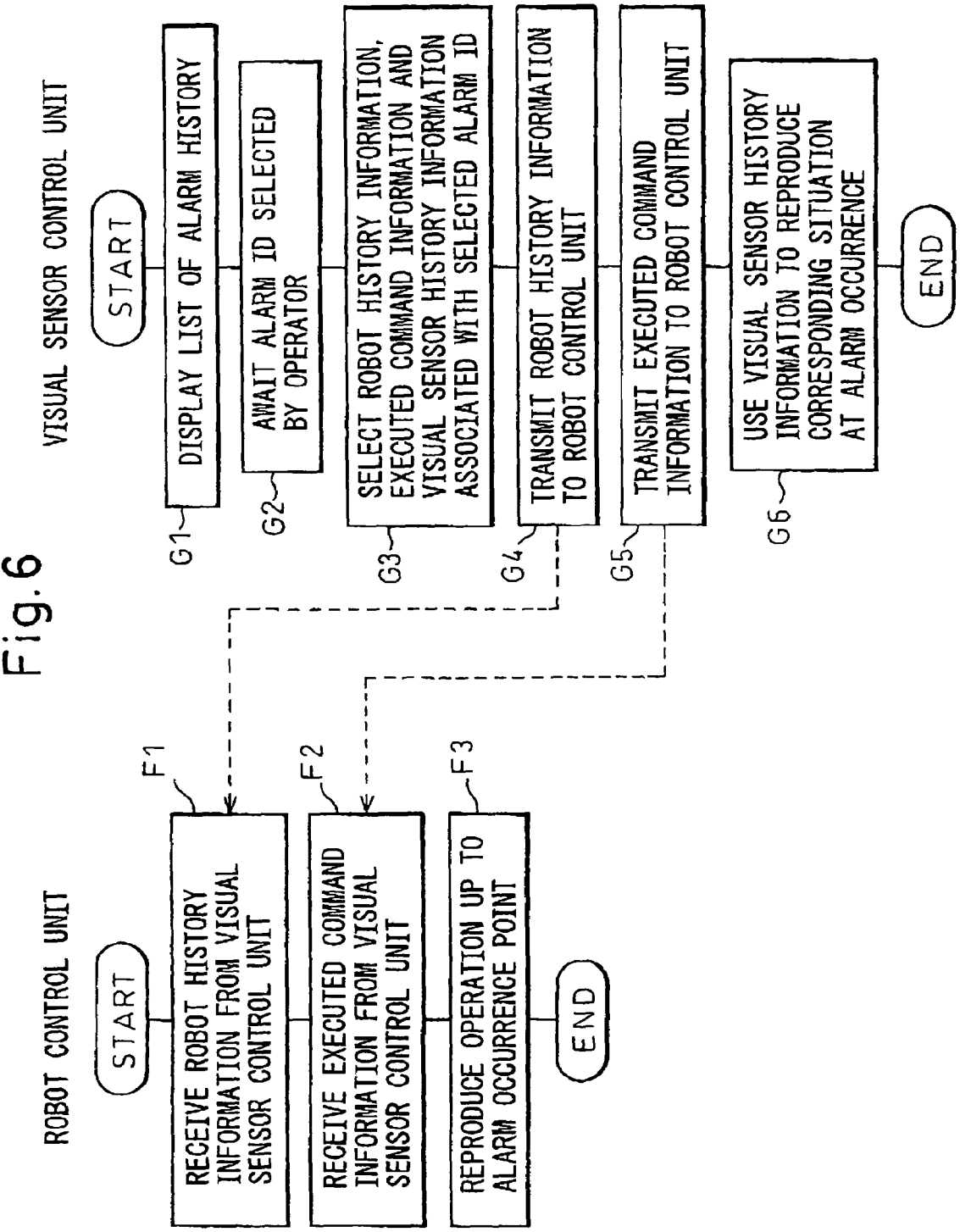
FIG. 6 is a flowchart illustrating an outline of a process executed for reproducing the alarm in the first embodiment.

In this embodiment, processes are executed in accordance with the flowchart shown in FIGS. 5 and 6. The flowchart of FIG. 5 represents an outline of an event driven process executed in the visual sensor control unit 23 and an interrupt process executed in the robot control unit 17 at the time of alarm occurrence. The flowchart of FIG. 6, on the other hand, represents an outline of a process executed in the robot control unit 17 and the visual sensor control unit 23 to reproduce a situation at the time of alarm occurrence.

The points of each step executed in the robot control unit 17 are as follows.

Step D1: Upon detection of an alarm, the robot control unit 17 determines an alarm ID and collects the robot history information such as the alarm type. While the robot is operating, a predetermined amount of the latest retrospective data is always accumulated in the robot control unit 17 as robot history information (the old data in the nonvolatile RAM is erased and new data is added and stored from time to time).

Step D2: The alarm occurrence and the alarm ID are notified to the visual sensor control unit 23.

Step D3: The robot history information collected in step D1 are transmitted to the visual sensor control unit 23.

Step D4: The executed command information is transmitted to the visual sensor control unit 23 to thereby complete the interrupt process.

On the other hand, the points of each step executed in the visual sensor control unit 23 are as follows.

Step E1: A start command from the robot control unit 17 to the visual sensor 21 is awaited. After starting the robot 15, the notification of the alarm occurrence can be received at the time of alarm occurrence.

Step E2: If a received communication is a detection command, the process proceeds to step E3, while if it is the notification of the alarm occurrence, the process proceeds to step E8.

Step E3: A content of the process is selected depending on the content of the detection command.

Step E4: An imaging trigger is sent to the visual sensor (sensor head)21 to take an image.

Step E5: The image acquired by the visual sensor 21 is loaded into the visual sensor control unit 23 and subject to an image processing.

Step E6: The result of the image processing is transmitted to the robot control unit 17.

Step E7: The image, the content of the process, the parameters, the result of the processing, the time, etc. are recorded as measurement processing information, and the process is returned to step E1.

Step E8: The robot history information is received from the robot control unit 17.

Step E9: The executed command information is received from the robot control unit 17.

Step E10: The latest measurement processing information and the related measurement processing information are selected and stored as visual sensor history information.

Step E11: The robot history information and the executed command information are grouped and recorded with the visual sensor history information selected and stored in step E10. The alarm ID determined in step D1 can be used for this purpose. When the robot history information, the executed command information and the visual sensor history information are recorded, the process is completed.

The foregoing processes are an outline of the process executed in preparation for alarm occurrence and an outline of the process executed at the time of alarm occurrence. The process for reproducing a situation at the time of alarm occurrence is executed in accordance with the flowchart of FIG. 6, using the data thus recorded.

The points of each step executed in the robot control unit 17 are as follows.

Step F1: The robot history information is received from the visual sensor control unit 23.

Step F2: The executed command information is received from the visual sensor control unit 23.

Step F3: The robot history information and executed command information received in steps F1 and F2 are used to reproduce the operation from a robot position at a time point slightly before an alarm occurrence to a robot position at the time of alarm occurrence (the alarm occurrence point) (to reproduce the situation at the time of alarm occurrence by using the actual machine).

The points of each step executed by the visual sensor control unit 23 are as follows.

Step G1: A list of the alarm history is displayed on the display of the visual sensor control unit 23.

Step G2: The operator selects the alarm, which is desired to reproduce, from the alarm history list on the screen. Thus, the CPU of the visual sensor control unit 23 recognizes the alarm ID of the selected alarm.

Step G3: The robot history information, the executed command information and the visual sensor history information associated with the selected alarm ID are selected (read from the memory).

Step G4: The robot history information is transmitted to the robot control unit 17.

Step G5: The executed command information is transmitted to the robot control unit 17.

Step G6: The visual sensor history information selected in step G3 is used to reproduce the corresponding situation at the time of alarm occurrence by way of image processing (display the related image, the content of the process, etc. at the time of alarm on the display of the visual sensor control unit 23), and the process is completed.

Figure 2:
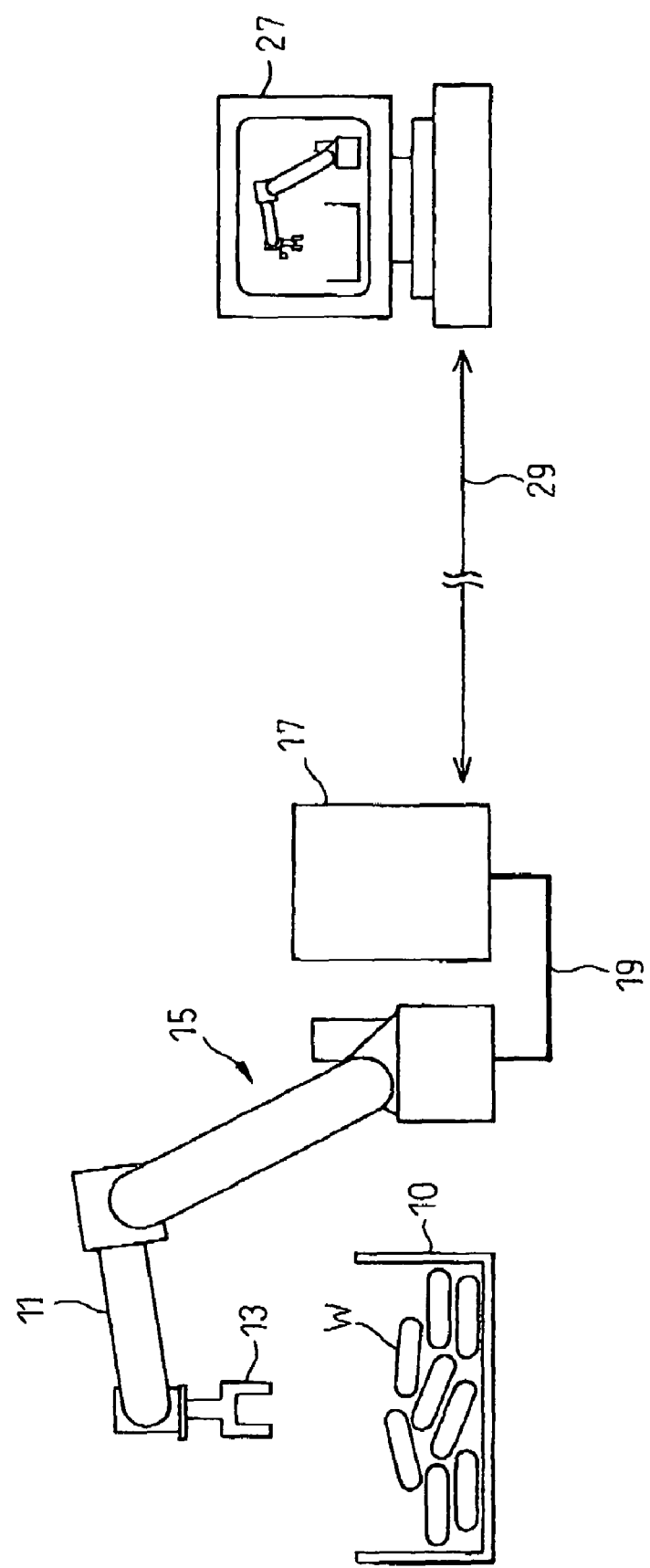
FIG. 2 is a diagram illustrating an outline of a robot system according to a second embodiment of the present invention.

Second Embodiment (FIG. 2)

Figure 7:
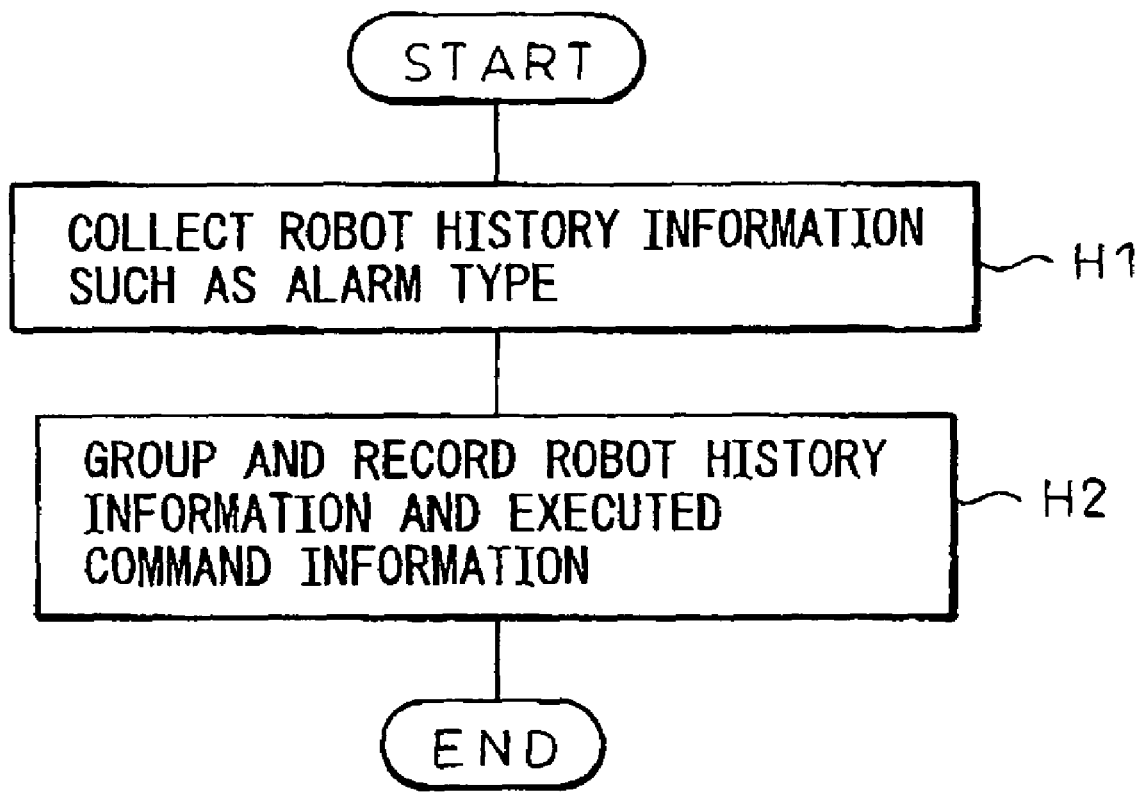
FIG. 7 is a flowchart illustrating outlines of a process executed at the time of alarm occurrence and a process executed in preparation for the alarm occurrence in the second embodiment.
Figure 8:
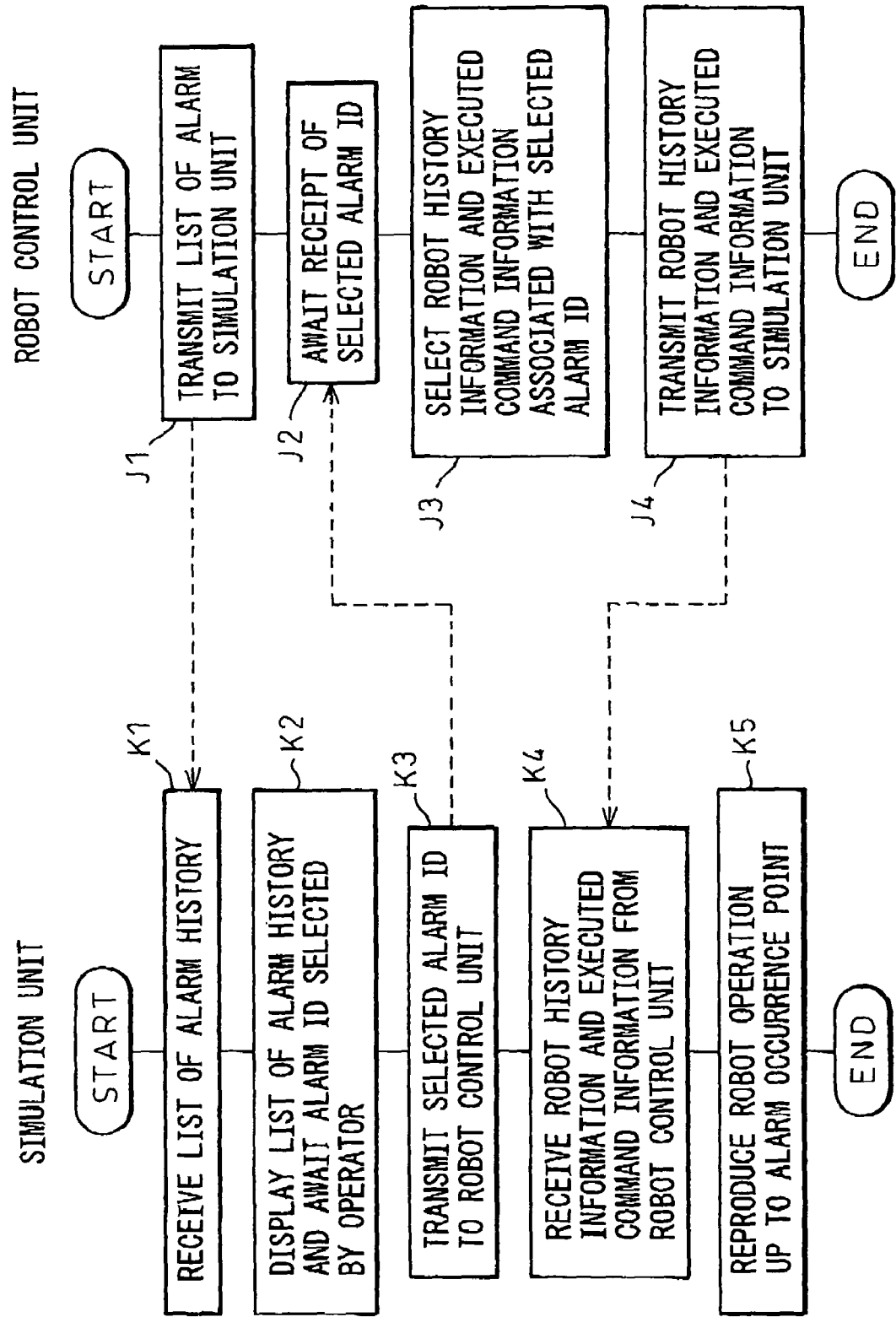
FIG. 8 is a flowchart illustrating an outline of a process executed for reproducing the alarm in the second embodiment.

In this embodiment, processes are executed in accordance with the flowcharts shown in FIGS. 7 and 8. The flowchart of FIG. 7 represents an outline of an interrupt process executed in the robot control unit 17 at the time of alarm occurrence. The flowchart of FIG. 8, on the other hand, represents an outline of a process executed in the robot control unit 17 and the simulation unit 27 to reproduce a situation at the time of alarm occurrence.

The points of each step executed in the robot control unit 17 are as follows.

Step H1: Upon detection of an alarm, the robot control unit 17 determines an alarm ID and collects the robot history information such as the alarm type. While the robot is operating, a predetermined amount of the latest retrospective data is always accumulated in the robot control unit 17 as robot history information (the old data in the nonvolatile RAM is erased and new data is added and stored from time to time).

Step H2: The robot history information and the executed command information are grouped and recorded. For this purpose, the alarm ID determined in step H1 can be used. When the robot history information and the executed command information are recorded, the interrupt process is completed.

The foregoing processes are an outline of the process executed in preparation for the alarm occurrence and an outline of the process executed at the time of alarm occurrence. The process for reproducing a situation at the time of alarm occurrence is executed in accordance with the flowchart of FIG. 8, using the data thus recorded.

The points of each step executed in the robot control unit 17 are as follows.

Step J1: A list of the alarm history is transmitted to the simulation unit 27.

Step J2: The receipt of the selected alarm ID is awaited. When it is received, the process proceeds to step J3.

Step J3: The robot history information and the executed command information associated with the selected alarm ID are selected (read from the memory).

Step J4: The robot history information and executed command information selected in step J3 are transmitted to the simulation unit 27, and the process is completed.

On the other hand, the points of each step executed in the simulation unit 27 are as follows.

Step K1: A list of the alarm history is received from the robot control unit 17.

Step K2: The operator selects the alarm, which is desired to reproduce, from the alarm history list on the screen. Thus, the CPU of the simulation unit 27 recognizes the alarm ID of the selected alarm.

Step K3: The selected ID alarm is transmitted to the robot control unit 17.

Step K4: The robot history information and the executed command information are received from the robot control unit 17.

Step K5: The robot history information and executed command information received in step K4 are used to execute a simulation for reproducing the operation from a robot position at a time point slightly before the alarm occurrence to a robot position at the time of alarm occurrence (alarm occurrence point) (for reproducing the situation at the time of alarm occurrence by using the simulation unit 27).

Figure 3:
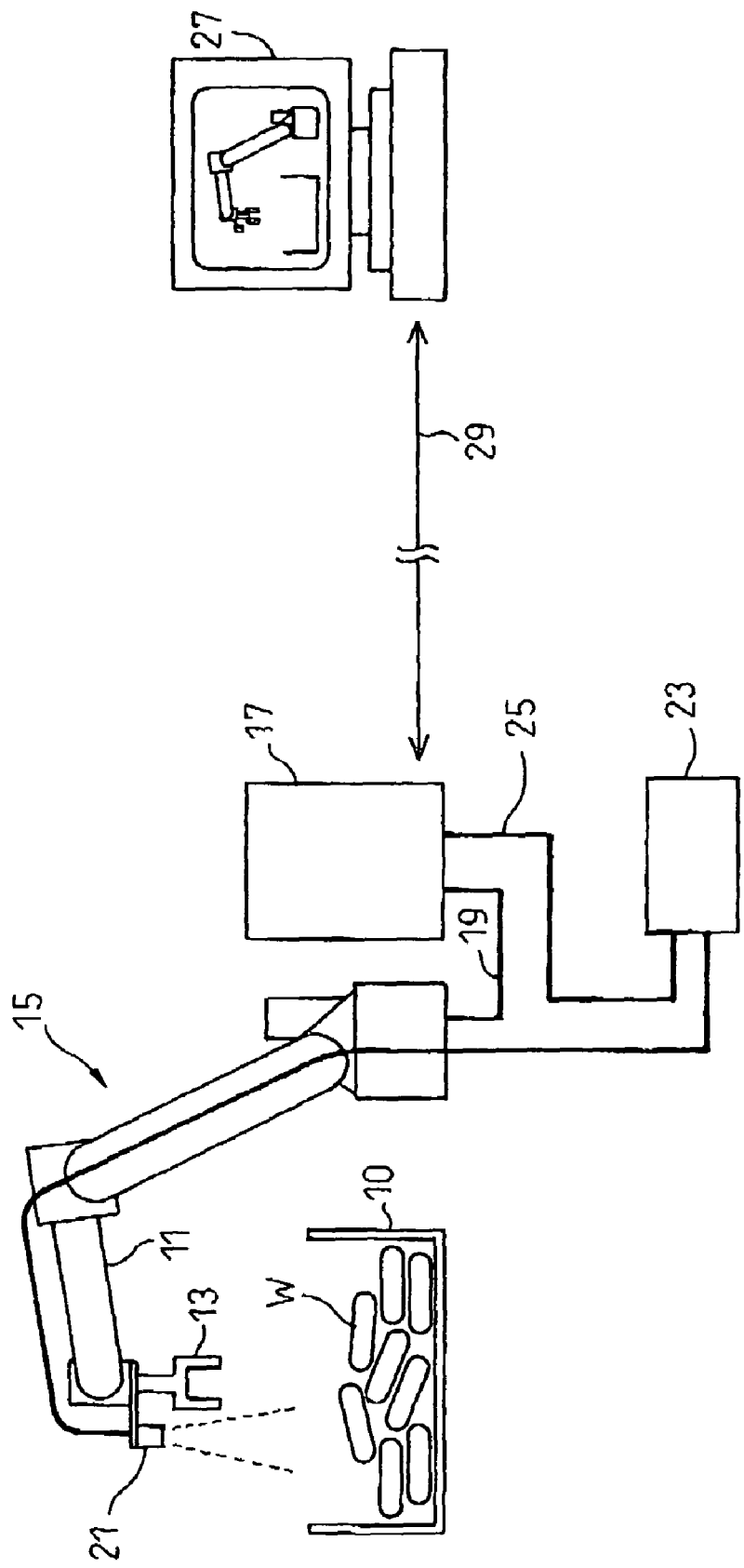
FIG. 3 is a diagram illustrating an outline of a robot system according to a third embodiment of the present invention.

Third Embodiment (FIG. 3)

Figure 9:
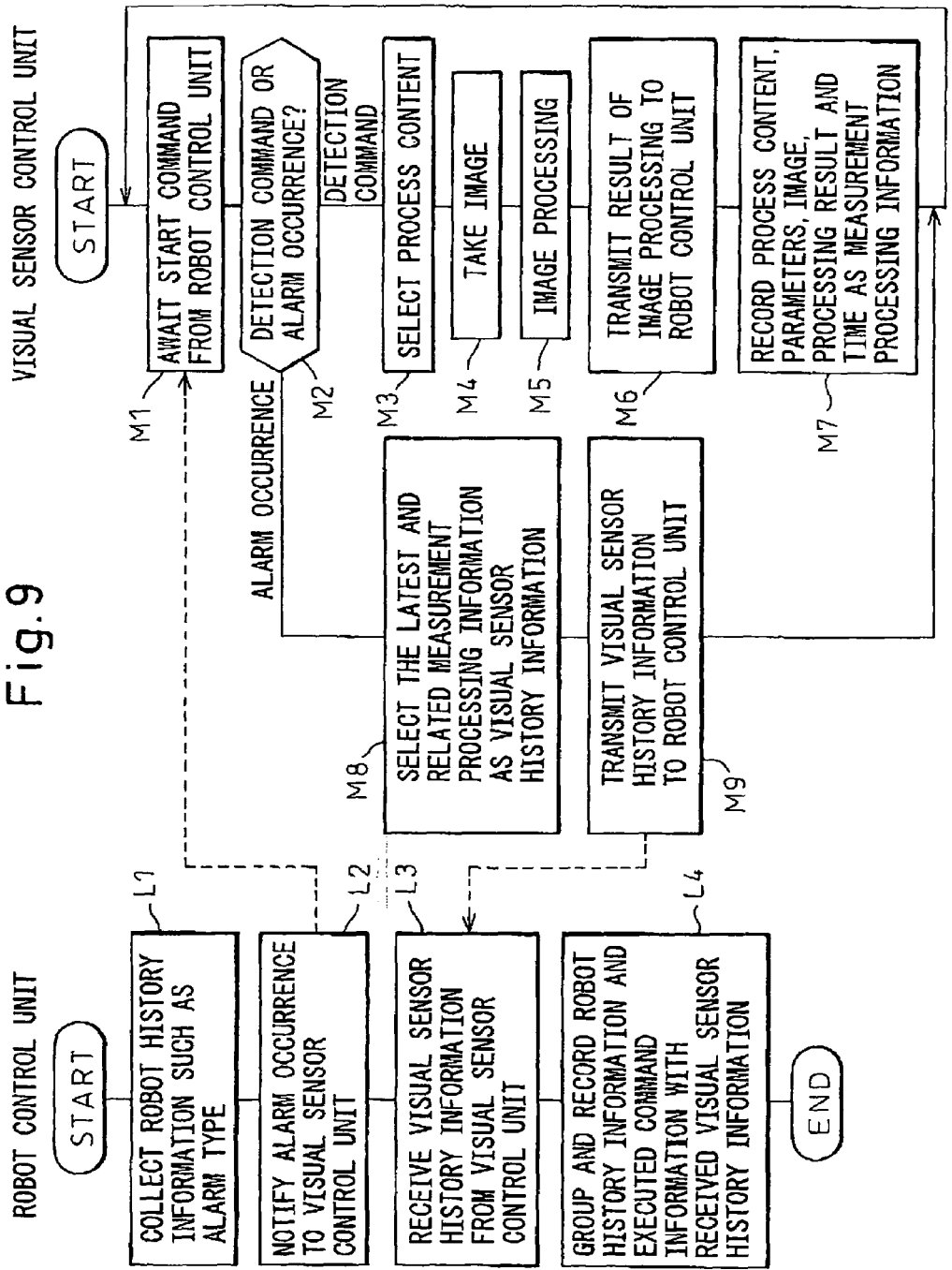
FIG. 9 is a flowchart illustrating outlines of a process executed at the time of alarm occurrence and a process executed in preparation for the alarm occurrence in the third embodiment.
Figure 10:
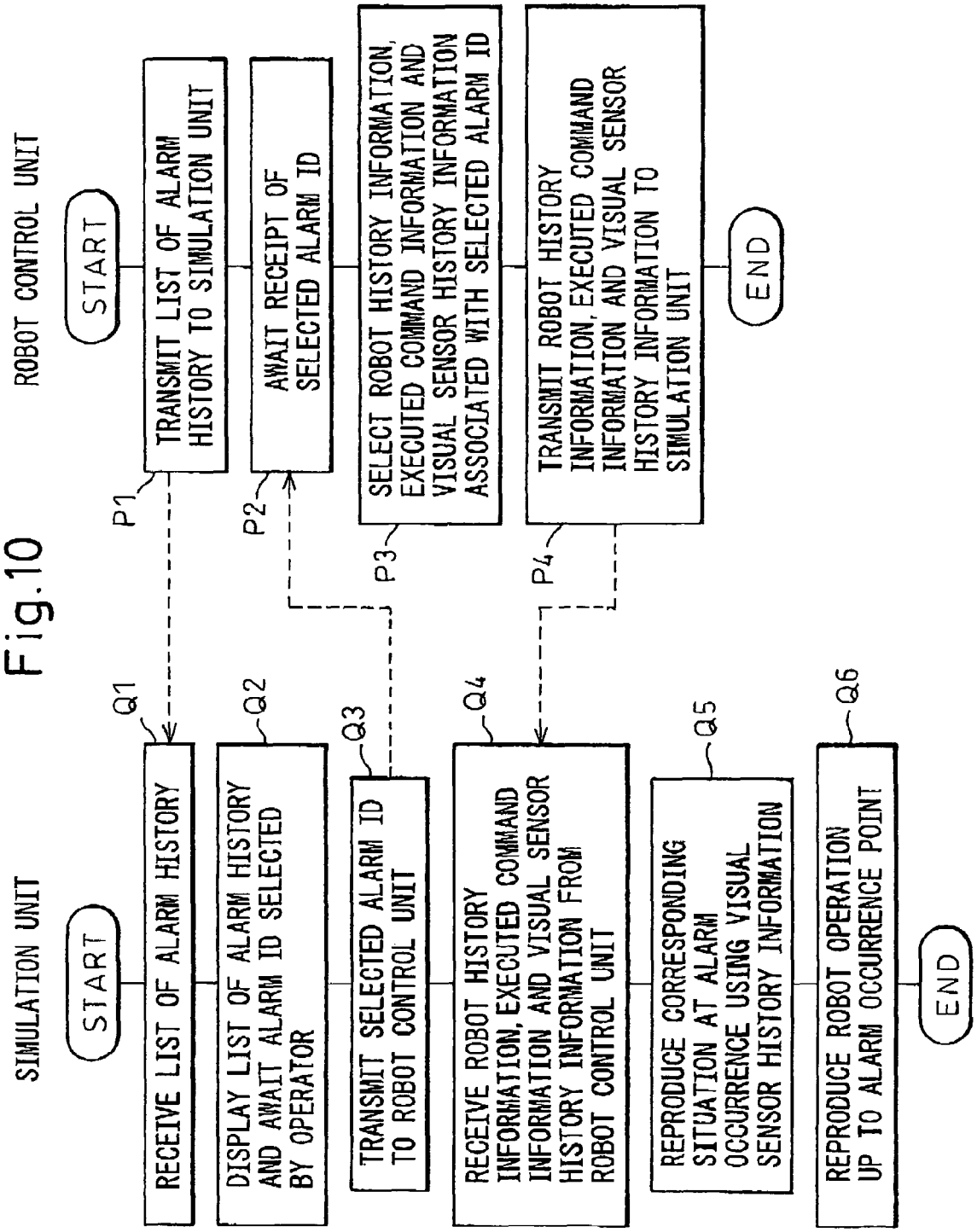
FIG. 10 is a flowchart illustrating an outline of a process executed for reproducing the alarm in the third embodiment.

In this embodiment, processes are executed in accordance with the flowcharts shown in FIGS. 9 and 10. The flowchart of FIG. 9 represents an outline of an event driven process executed in the visual sensor control unit 23 and an interrupt process executed in the robot control unit 17 at the time of alarm occurrence. The flowchart of FIG. 10, on the other hand, represents an outline of a process executed in the robot control unit 17 and the simulation unit 27 to reproduce a situation at the time of alarm occurrence.

The points of each step executed by the robot control unit 17 are as follows.

Step L1: Upon detection of an alarm, the robot control unit 17 determines an alarm ID and collects the robot history information such as the alarm type. While the robot is operating, a predetermined amount of the latest retrospective data is always accumulated in the robot control unit 17 as robot history information (the old data in the nonvolatile RAM is erased and new data is added and stored from time to time).

Step L2: The alarm occurrence and the alarm ID are notified to the visual sensor control unit 23.

Step L3: The visual sensor history information is received from the visual sensor control unit 23.

Step L4: The robot history information and the executed command information are grouped and recorded with the visual sensor history information received in step L3. For this purpose, the alarm ID determined in step L1 can be used. When the robot history information, the executed command information and the visual sensor history information are recorded, the process is completed.

On the other hand, the points of each step executed in the visual sensor control unit 23 are as follows.

Step M1: A start command from the robot control unit 17 to the visual sensor 21 is awaited. After starting the robot 15, the notification of the alarm occurrence can be received at the time of alarm occurrence.

Step M2: If a received communication is a detection command, the process proceeds to step M3, while if it is the notification of the alarm occurrence, the process proceeds to step M8.

Step M3: A content of the process is selected depending on the content of the detection command.

Step M4: An imaging trigger is sent to the visual sensor (sensor head) 21 to take an image.

Step M5: The image acquired by the visual sensor 21 is loaded into the visual sensor control unit 23, and subject to an image processing.

Step M6: The result of the image processing is transmitted to the robot control unit 17.

Step M7: The image, the content of the process, the parameters, the result of the processing, the time, etc. are recorded as measurement processing information, and the process returns to step M1.

Step M8: The latest measurement processing information and the related measurement processing information are selected and stored as visual sensor history information.

Step M9: The visual sensor history information is transmitted to the robot control unit 17, and the process is completed.

The foregoing processes are an outline of the process executed in preparation for alarm occurrence and an outline of the process executed at the time of alarm occurrence. The process for reproducing a situation at the time of alarm occurrence is executed in accordance with the flowchart of FIG. 10, using the data thus recorded.

The points of each step executed in the robot control unit 17 are as follows.

Step P1: A list of the alarm history is transmitted to the simulation unit 27.

Step P2: The receipt of the selected alarm ID is awaited. When it is received, the process proceeds to step P3.

Step P3: The robot history information, executed command information and visual sensor history information associated with the selected alarm ID are selected (read from the memory).

Step P4: The robot history information, the executed command information and the visual sensor history information are transmitted to the simulation unit 27, and the process is completed.

On the other hand, the points of each step executed in the simulation unit 27 are as follows.

Step Q1: A list of the alarm history is received from the robot control unit 17.

Step Q2: The operator selects the alarm, which is desired to reproduce, from the alarm history list on the screen. Thus, the CPU of the simulation unit 27 recognizes the alarm ID of the selected alarm.

Step Q3: The selected alarm ID is transmitted to the robot control unit 17.

Step Q4: The robot history information, the executed command information and the visual sensor history information are received from the robot control unit 17.

Step Q5: The visual sensor history information received in step K4 is used to reproduce the corresponding situation at the time of alarm occurrence by way of the image processing (display the related image, the content of the process, etc. at the time of alarm occurrence on the display of the simulation unit 27).

Step Q6: The information received in step K4 is used to execute a simulation for reproducing the operation from a robot position at the time point slightly before alarm occurrence to a robot position at the time of alarm occurrence (alarm occurrence point) (for reproducing the situation at the time of alarm occurrence by using the simulation unit 27).

Figure 4:
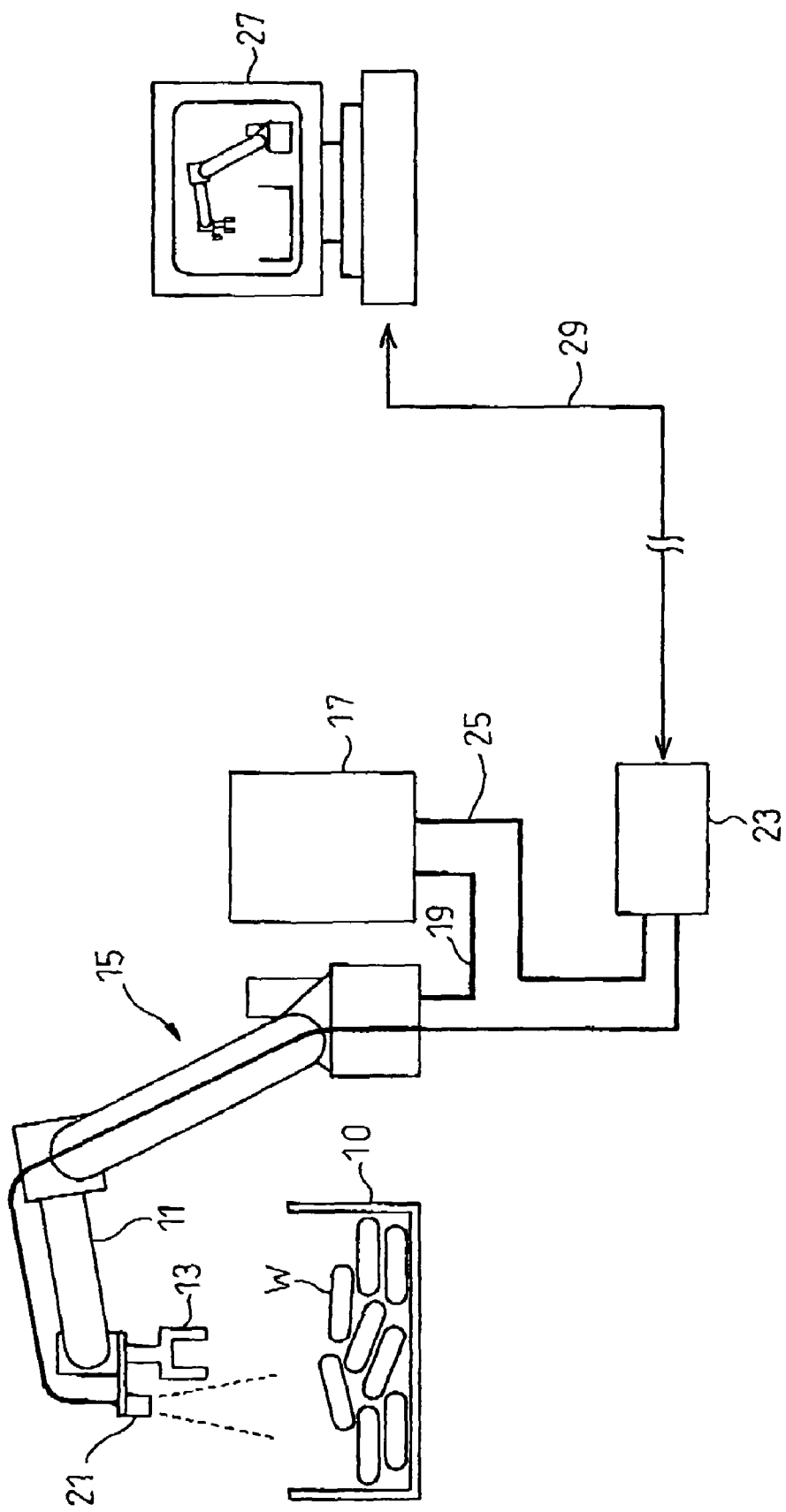
FIG. 4 is a diagram illustrating an outline of a robot system according to a fourth embodiment of the present invention.

Fourth Embodiment (FIG. 4)

Figure 11:
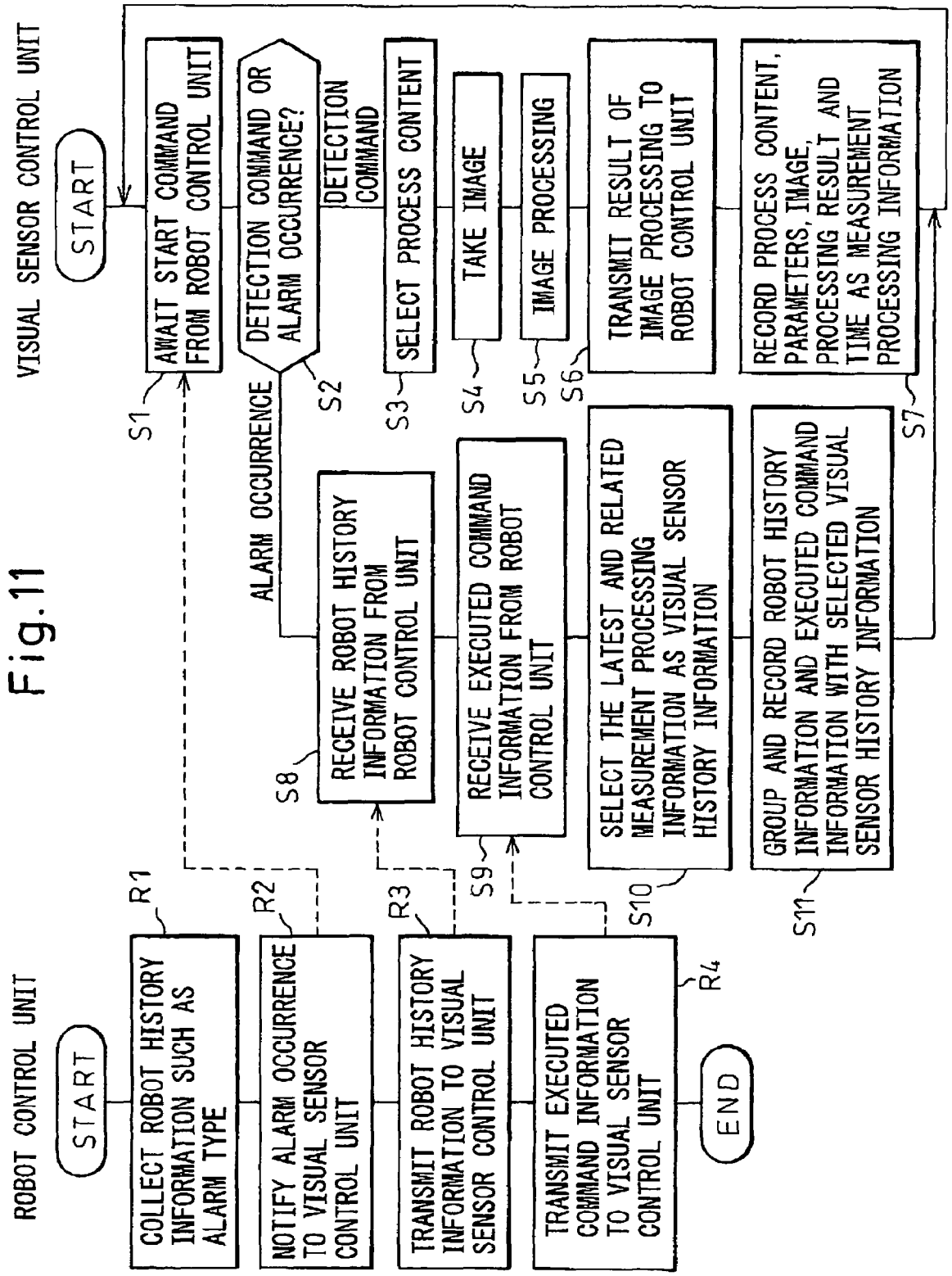
FIG. 11 is a flowchart illustrating outlines of a process executed at the time of alarm occurrence and a process executed in preparation for the alarm occurrence in the fourth embodiment.

In this embodiment, processes are executed in accordance with the flowcharts shown in FIGS. 11 and 12. The flowchart of FIG. 11 represents an outline of an event driven process executed in the visual sensor control unit 23 and an interrupt process executed at the time of alarm occurrence in the robot control unit 17. The flow chart of FIG. 12, on the other hand, represents an outline of a process executed in the visual sensor control unit 23 and the simulation unit 27 to reproduce a situation at the time of alarm occurrence.

The points of each step executed in the visual sensor control unit 23 are as follows.

Step S1: A start command from the robot control unit 17 to the visual sensor 21 is awaited. After starting the robot 15, a notification of the alarm occurrence can be received at the time of alarm occurrence.

Step S2: If a received communication is a detection command, the process proceeds to step M3, while if it is the notification of the alarm occurrence, the process proceeds to step S8.

Step S3: A content of the process is selected depending on the content of the detection command.

Step S4: An imaging trigger is sent to the visual sensor (sensor head) 21 to take an image.

Step S5: The image acquired by the visual sensor 21 is loaded into the visual sensor control unit 23, and subject to an image processing.

Step S6: The result of the image processing is transmitted to the robot control unit 17.

Step S7: The image, the content of the process, the parameters, the result of the processing, the time, etc. are recorded as measurement processing information, and the process returns to step S1.

Step S8: The robot history information is received from the robot control unit 17.

Step S9: The executed command information is received from the robot control unit 17.

Step S10: The latest measurement processing information and the related measurement processing information are selected and stored as visual sensor history information.

Step S11: The robot history information and the executed command information are grouped and recorded with the visual sensor history information selected and stored in step S10. For this purpose, the alarm ID determined in the robot control unit 17 (step R1, described later) can be used. When the robot history information, the executed command information and the visual sensor history information are recorded, the process is completed.

On the other hand, the points of each step executed in the robot control unit 17 are as follows.

Step R1: Upon detection of an alarm, the robot control unit 17 determines an alarm ID and collects the robot history information such as the alarm type. While the robot is operating, a predetermined amount of the latest retrospective data is always accumulated in the robot control unit 17 as robot history information (the old data in the nonvolatile RAM is erased and new data is added and stored from time to time).

Step R2: The alarm occurrence and the alarm ID are notified to the visual sensor control unit 27.

Step R3: The executed command information is transmitted to the visual sensor control unit 23, and the process is completed.

The foregoing processes are an outline of the process executed in preparation for alarm occurrence and an outline of the process executed at the time of alarm occurrence. The process for reproducing a situation at the time of alarm occurrence is executed in accordance with the flowchart of FIG. 12, using the data thus recorded.

The points of each step executed in the simulation unit 27 are as follows.

Step T1: A list of alarm history is received from the visual sensor control unit 23.

Step T2: The operator selects the alarm, which is desired to reproduce, from the alarm history list on the screen. Thus, the CPU of the simulation unit 27 recognizes the alarm ID of the selected alarm.

Step T3: The selected alarm ID is transmitted to the visual sensor control unit 23.

Step T4: The robot history information, the executed command information and the visual sensor history information are received from the visual sensor control unit 23.

Step T5: The visual sensor history information received in step T4 is used to reproduce the corresponding situation at the time of alarm occurrence by way of image processing (display the related image, the content of the process, etc. at the time of alarm occurrence on the display of the simulation unit 27).

Step T6: The information received in step T4 is used to execute a simulation for reproducing the operation from a robot position at the time point slightly before the alarm occurrence to a robot position at the time of alarm occurrence (alarm occurrence point) (for reproducing the situation at the time of alarm occurrence is reproduced by using the simulation unit 27).

On the other hand, the points of each step executed in the visual sensor control unit 23 are as follows.

Step U1: A list of alarm history is transmitted to the simulation unit 27.

Step U2: The receipt of the selected alarm ID is awaited. When it is received, the process proceeds to step U3.

Step U3: The robot history information, executed command information and visual sensor history information associated with the selected alarm ID are selected (read from the memory).

Step U4: The robot history information, the executed command information and the visual sensor history information are transmitted to the simulation unit 27, and the process is completed.

As described above, when an alarm relating to a clash or the like occurs, the robot system according to the present invention (such as a robot system for carrying out the operation of taking out a part from bulk parts, for example) stores an alarm information together with a position and an orientation at the time of alarm occurrence, the target position and orientation at the time of alarm occurrence, the result of the image processing and the related data which has affected the robot operation, and reproduces the alarm situation based on this information. The reproduction can be implemented by either the on-line reproduction by means of the actual robot machine or the off-line reproduction by means of the simulation unit (arranged at a remote place, for example). Also, this reproduction makes it possible not only to confirm the specifics of the trouble, but also to know the detail of the situation of the robot (the orientation thereof at the time of alarm occurrence and the orientation thereof in the process before alarm occurrence) at the time of trouble occurrence, thereby facilitating the tracing of the cause and the removal of the problem. Further, in the case where the simulation unit is used for reproducing the trouble situation by simulation, the change of the robot program or the values of the parameters for image processing can be carried out on line to remove the problem. Therefore, the preventive measure can be taken very efficiently.

Although the present invention has been described based on the embodiments shown in the accompanying drawings, these embodiments are only illustrative and not limitative. Accordingly, the scope of the present invention is limited by the appended claims, and the embodiments of the present invention may be modified or changed without departing from the scope of the claims.

What is claimed is:

1. A robot system capable of reproducing a situation at the time of alarm occurrence, said robot system comprising:
    a robot; and
    a simulation unit connected to said robot through a communication line and for simulating operations of said robot,
    said robot comprising:
        a means for recording, upon occurrence of a predefined alarm in said robot in operation, an operating condition of the robot at the time of alarm occurrence as robot history information; and
        a means for transmitting the robot history information through said communication line to said simulation unit, and
    said simulation unit comprising:
        a means for receiving the robot history information transmitted from said robot; and
        a means for reproducing the operating condition of said robot at the time of alarm occurrence by simulation using the received robot history information.

2. The robot system according to claim 1, wherein the robot history information includes information representing at least one of a position which said robot has reached, a target position at which said robot aimed, an interpolation mode used by said robot to operate, an alarm generated in said robot, and a time of alarm occurrence.

3. The robot system according to claim 1, wherein said communication line is adapted to be able to switch between a connected state and a disconnected state.

4. The robot system according to claim 1, wherein said simulation unit is adapted to be able to load a robot program describing the operation of said robot through said communication line, and has a function to change a teaching content of the robot program on said simulation unit and then apply the changed robot program to said robot.

5. A robot system capable of reproducing a situation at the time of alarm occurrence, said robot system comprising:
    a robot; and
    a simulation unit connected to the robot through a communication line and for simulating operations of the robot,
    said robot comprising:
        a means for temporarily storing a predetermined amount of the latest executed operation commands as executed command information;
        a means for recording, upon the occurrence of a predefined alarm in said robot in operation, an operating condition of said robot at the time of alarm occurrence as robot history information; and
        a means for transmitting the executed command information and the robot history information through said communication line to said simulation unit, and
    said simulation unit comprising:
        a means for receiving the executed command information and robot history information transmitted from said robot; and
        a means for reproducing the operating condition of said robot before, and at the time of, the alarm occurrence by simulation using the received executed command information and robot history information.

6. The robot system according to claim 5, wherein the robot history information includes information representing at least one of a position which said robot has reached, a target position at which said robot aimed, an interpolation mode used by said robot to operate, an alarm generated in said robot, and a time of alarm occurrence.

7. The robot system according to claim 5, wherein said communication line is adapted to be able to switch between a connected state and a disconnected state.

8. The robot system according to claim 5, wherein said simulation unit is adapted to be able to load a robot program describing the operation of said robot through said communication line, and has a function to change a teaching content of the robot program on said simulation unit and then apply the changed robot program to said robot.

9. A robot system capable of reproducing a situation at the time of alarm occurrence, said robot system comprising:
    a robot;
    a visual sensor connected to said robot through a data transmitting means and for measuring one or both of a position and an orientation of an object in accordance with a command from said robot and transmitting a measurement result to said robot; and
    a simulation unit connected to said robot through a communication line and for simulating one or both of operations of said robot and processes of said visual sensor,
    said robot comprising:
        a means for notifying, upon occurrence of a predefined alarm in said robot in operation, an alarm occurrence to said visual sensor and recording an operating condition of said robot at the time of alarm occurrence as robot history information;
        a means for receiving measurement processing information of said visual sensor associated with the robot operation at the time of alarm occurrence from said visual sensor and recording the measurement processing information as sensor history information; and
        a means for transmitting the robot history information and the sensor history information through said communication line to said simulation unit, and
    said visual sensor comprising:
        an accumulation means for accumulating the measurement processing information obtained by measurement; and
        a means for selecting, upon receipt of the notification of the alarm occurrence from said robot, the measurement processing information associated with the robot operation at the time of alarm occurrence from the measurement processing information accumulated in said accumulation means, and transmitting the selected measurement processing information to said robot, and
    said simulation unit comprising:
        a means for receiving the robot history information and sensor history information transmitted from said robot;
        a means for reproducing the operating condition of said robot at the time of alarm occurrence by simulation using the received robot history information; and
        a means for reproducing the processing process of said visual sensor by simulation using the received sensor history information.

10. The robot system according to claim 9, wherein the robot history information includes information representing at least one of a position which said robot has reached, a target position at which said robot aimed, an interpolation mode used by said robot to operate, an alarm generated in said robot, and a time of alarm occurrence, and
    wherein the sensor history information includes information representing at least one of an image taken by said visual sensor, a content processed by said visual sensor, and a result of measurement processing in said visual sensor.

11. The robot system according to claim 9, wherein said communication line is adapted to be able to switch between a connected state and a disconnected state.

12. The robot system according to claim 9, wherein said simulation unit is adapted to be able to load a robot program describing the operation of said robot through said communication line, and has a function to change a teaching content of the robot program on said simulation unit and then apply the changed robot program to said robot.

13. The robot system according to claim 9, wherein said simulation unit is adapted to be able to load visual sensor processing parameters defining a process of said visual sensor through said communication line, and has a function to change a content of said visual sensor processing parameters on said simulation unit and then apply the changed visual sensor processing parameters to said visual sensor.

14. A robot system capable of reproducing a situation at the time of alarm occurrence, said robot system comprising:
a robot;
a visual sensor connected to said robot through a data transmitting means and for measuring one or both of a position and an orientation of an object in accordance with a command from said robot and transmitting a measurement result to said robot; and
a simulation unit connected to said robot through a communication line and for simulating one or both of operations of said robot and processes of said visual sensor,
said robot comprising:
a means for temporarily storing a predetermined amount of the latest executed operation commands as executed command information;
a means for notifying, upon occurrence of a predefined alarm in said robot in operation, an alarm occurrence to said visual sensor and recording an operating condition of said robot, at the time of alarm occurrence, as robot history information;
a means for receiving measurement processing information of said visual sensor associated with the robot operation at the time of alarm occurrence and recording the measurement processing information as sensor history information; and
a means for transmitting the executed command information, the robot history information and the sensor history information through said communication line to said simulation unit,
said visual sensor comprising:
an accumulation means for accumulating the measurement processing information obtained by measurement; and
a means for selecting, upon receipt of the notification of the alarm occurrence from said robot, the measurement processing information associated with the robot operation at the time of alarm occurrence from the measurement processing information accumulated in said accumulation means and transmitting the selected measurement processing information to said robot, and
said simulation unit comprising:
a means for receiving the executed command information, the robot history information and the sensor history information transmitted from said robot;
a means for reproducing the operating condition of said robot before and at the time of alarm occurrence by simulation using the received executed command information and robot history information; and
a means for reproducing the processing process of said visual sensor by simulation using the received sensor history information.

15. The robot system according to claim 14, wherein the robot history information includes information representing at least one of a position which said robot has reached, a target position at which said robot aimed, an interpolation mode used by said robot to operate, an alarm generated in said robot, and a time of alarm occurrence, and
wherein the sensor history information includes information representing at least one of an image taken by said visual sensor, a content processed by said visual sensor, and a result of measurement processing in said visual sensor.

16. The robot system according to claim 14, wherein said communication line is adapted to be able to switch between a connected state and a disconnected state.

17. The robot system according to claim 14, wherein said simulation unit is adapted to be able to load a robot program describing the operation of said robot through said communication line, and has a function to change a teaching content of the robot program on said simulation unit and then apply the changed robot program to said robot.

18. The robot system according to claim 14, wherein said simulation unit is adapted to be able to load visual sensor processing parameters defining a process of said visual sensor through said communication line, and has a function to change a content of said visual sensor processing parameters on said simulation unit and then apply the changed visual sensor processing parameters to said visual sensor.

* * * * *

UNITED STATES PATENT AND TRADEMARK OFFICE
CERTIFICATE OF CORRECTION

PATENT NO. : 7,590,468 B2 Page 1 of 1
APPLICATION NO. : 10/952101
DATED : September 15, 2009
INVENTOR(S) : Watanabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1386 days.

Signed and Sealed this

Twenty-first Day of September, 2010

David J. Kappos
*Director of the United States Patent and Trademark Office*